(12) United States Patent
Heo et al.

(10) Patent No.: US 12,155,625 B2
(45) Date of Patent: Nov. 26, 2024

(54) ELECTRONIC DEVICE FOR CONTROLLING PACKET TRANSMISSION, AND OPERATING METHOD THEREOF

(71) Applicant: Samsung Electronics Co., Ltd., Gyeonggi-do (KR)

(72) Inventors: Joonyoung Heo, Gyeonggi-do (KR); Dongha Kang, Gyeonggi-do (KR); Gyujoon Park, Gyeonggi-do (KR); Jinmo Sung, Gyeonggi-do (KR); Chihun Ahn, Gyeonggi-do (KR); Minjung Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 249 days.

(21) Appl. No.: 17/744,030

(22) Filed: May 13, 2022

(65) Prior Publication Data

US 2022/0272070 A1 Aug. 25, 2022

Related U.S. Application Data

(63) Continuation of application No. PCT/KR2020/009703, filed on Jul. 23, 2020.

(30) Foreign Application Priority Data

Nov. 18, 2019 (KR) .......................... 10-2019-0147937

(51) Int. Cl.
*H04L 9/40* (2022.01)
*G06F 9/50* (2006.01)
*H04L 67/1097* (2022.01)

(52) U.S. Cl.
CPC ........ *H04L 63/0236* (2013.01); *G06F 9/5016* (2013.01); *H04L 63/20* (2013.01); *H04L 67/1097* (2013.01)

(58) Field of Classification Search
CPC . H04L 63/0236; H04L 63/20; H04L 67/1097; H04L 67/306; H04L 69/321;
(Continued)

(56) References Cited

U.S. PATENT DOCUMENTS 10,225,204 B2 3/2019 Zhang et al.
11,212,701 B2 * 12/2021 Tseng .................... H04L 1/1825
(Continued)

FOREIGN PATENT DOCUMENTS

JP 2004-334607 A 11/2004
KR 10-2007-0030096 A 3/2007
(Continued)

OTHER PUBLICATIONS

Korean Office Action dated Oct. 14, 2024.

*Primary Examiner* — Mohammed Waliullah
(74) *Attorney, Agent, or Firm* — Cha & Reiter, LLC

(57) ABSTRACT

According to certain embodiments, an electronic device comprises: a communication module; at least one processor; and a memory electrically connected to the at least one processor, wherein the memory stores instructions, that when executed, cause the at least one processor to perform a plurality of operations, the plurality of operations comprising: determining whether a packet received through the communication module satisfies at least one packet filtering rule, transmitting the packet directly to a user address space allocated to the memory, bypassing a network stack included in a kernel address space allocated to the memory, when the packet satisfies the at least one packet filtering rule, and transmitting the packet to the user address space through the network stack included in the kernel address space allocated to the memory when the packet does not satisfy the at least one packet filtering rule.

20 Claims, 11 Drawing Sheets

(58) Field of Classification Search
CPC ......... H04L 43/00; H04L 47/24; H04L 49/90;
H04L 63/0263; H04L 69/22; H04L
47/2441; H04L 43/028; H04L 49/9078;
G06F 9/5016
See application file for complete search history.

(56) References Cited

U.S. PATENT DOCUMENTS

| | | | |
|---|---|---|---|
| 2007/0183418 A1* | 8/2007 | Riddoch | ................ H04L 12/18 370/389 |
| 2011/0016519 A1 | 1/2011 | Sauter et al. | |
| 2011/0249564 A1 | 10/2011 | Cho | |
| 2015/0106637 A1* | 4/2015 | Zhang | .................. G06F 1/3218 713/320 |
| 2016/0095094 A1 | 3/2016 | Xu et al. | |
| 2018/0109433 A1* | 4/2018 | Nagaraj | .................. H04L 41/22 |
| 2019/0140974 A1 | 5/2019 | Sung et al. | |

FOREIGN PATENT DOCUMENTS

| | | |
|---|---|---|
| KR | 10-2012-0090934 A | 8/2012 |
| KR | 10-1661161 B1 | 9/2016 |
| KR | 10-2017-0060018 A | 5/2017 |
| KR | 10-2018-0105416 A | 9/2018 |
| KR | 10-2019-0052749 A | 5/2019 |

* cited by examiner

ELECTRONIC DEVICE FOR CONTROLLING PACKET TRANSMISSION, AND OPERATING METHOD THEREOF

CROSS-REFERENCE TO RELATED APPLICATION(S)

This application is a continuation of PCT International Application No. PCT/KR2020/009703, filed Jul. 23, 2020, and claims priority to Korean Patent Application No. 10-2019-0147937, filed on Nov. 18, 2019, in the Korean Intellectual Property Office, the disclosures of which are incorporated by reference herein, in their entirety.

BACKGROUND

Technical Field

Embodiments of the disclosure relate to an electronic device for controlling transmission of a network packet and a method of operating the same.

Description of Related Art

An electronic device may process a data packet received from another electronic device. A communication modem of the electronic device may receive data packets, process the received data packets, and transfer the processed data packets to a higher layer of the network stack. The operation in which the communication modem transfers the received data packets to the higher layer may vary depending on a network stack implementation in each operating system.

For example, the data packets received through the communication modem in the electronic device may be transferred to an application processor. The data packets transferred to the application processor may be transmitted to a user application (or a user socket) which is a higher layer via a network interface card (NIC) of the application processor and a TCP/IP stack.

A data packet received by an electronic device through a communication model may be delayed until the packet is transmitted to a user application via a network stack. The various delay elements may be, for example, time spent for merging packets in the network stack of the electronic device, a delay due to packet scheduling, time spent for identifying and calling a protocol corresponding to the packet, time spent for identifying an IP and/or a port of the packet, time spent for searching and matching a routing table on the basis of the IP and/or the port of the packet, time spent for determining a socket to which the packet is transmitted, and time spent for copying the network stack-processed packet to a memory address space of an application process. As described above, the delay elements in the network stack may be causes that interrupt low-latency and high-reliable communication requirements of the electronic device.

SUMMARY

According to certain embodiments, an electronic device comprises: a communication module; at least one processor; and a memory electrically connected to the at least one processor, wherein the memory stores instructions, that when executed, cause the at least one processor to perform a plurality of operations, the plurality of operations comprising: determining whether a packet received through the communication module satisfies at least one packet filtering rule, transmitting the packet directly to a user address space allocated to the memory, bypassing a network stack included in a kernel address space allocated to the memory, when the packet satisfies the at least one packet filtering rule, and transmitting the packet to the user address space through the network stack included in the kernel address space allocated to the memory when the packet does not satisfy the at least one packet filtering rule.

According to certain embodiments, a method of operating an electronic device comprises: determining whether a packet received through a communication module satisfies at least one packet filtering rule; transmitting the packet directly to a user address space allocated to a memory by bypassing a network stack included in a kernel address space allocated to the memory, when the packet satisfies the at least one packet filtering rule; and transmitting the packet to the user address space through the network stack included in the kernel address space allocated to the memory when the packet does not satisfy the at least one packet filtering rule.

According to certain embodiments, a non-transitory computer readable medium stores a plurality of instructions wherein execution of the plurality of instructions by one or more processors causes the one or more processors to perform a plurality of operations comprising: determining whether a packet received through a communication module satisfies at least one packet filtering rule; transmitting the packet directly to a user address space allocated to a memory by bypassing a network stack included in a kernel address space allocated to the memory, when the packet satisfies the at least one packet filtering rule; and transmitting the packet to the user address space through the network stack included in the kernel address space allocated to the memory when the packet does not satisfy the at least one packet filtering rule.

DETAILED DESCRIPTION

Figure 1:
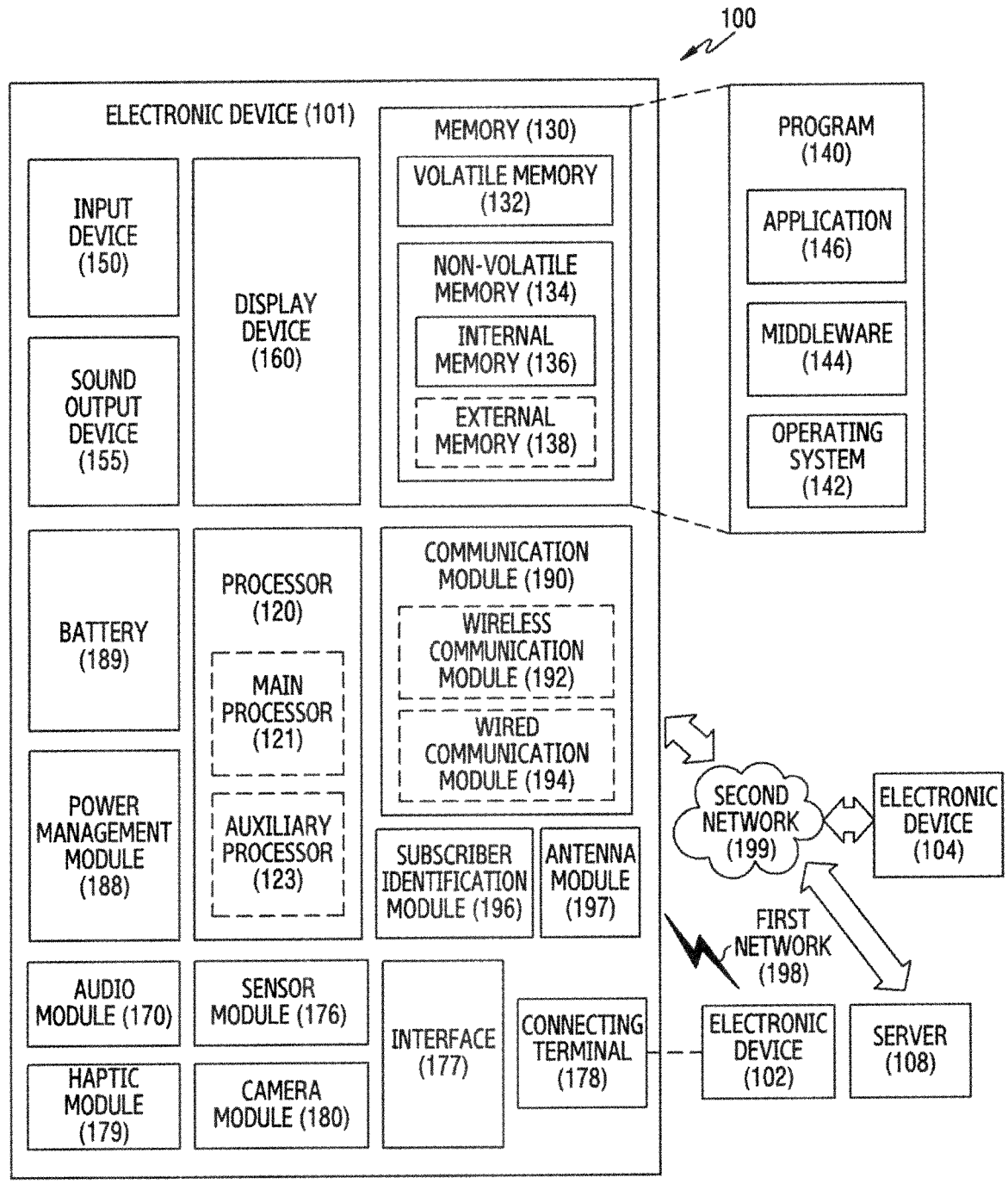
FIG. 1 is a block diagram illustrating an electronic device within a network environment according to certain embodiments.

Accordingly, certain embodiments of the disclosure disclose a method and an apparatus for controlling transmission of network packets in an electronic device.

According to certain embodiments of the disclosure, when a packet received by an electronic device satisfies a predetermined packet filtering rule, the electronic device may bypass a network stack to directly transmit the packet to a predetermined application. As a result, low-latency may be achieved as well as an appropriate protocol according to the purpose of the predetermined application.

Hereinafter, certain embodiments of the disclosure will be described with reference to the accompanying drawings. The embodiments and the terms used herein are not intended to limit the technology disclosed herein to specific implementation forms, and should be understood to include various modifications, equivalents, and/or alternatives to the corresponding embodiments. In describing the drawings, similar reference numerals may be used to designate similar elements. A singular expression may include a plural expression unless they are definitely different in context.

The technical subjects pursued in the disclosure are not limited to the above mentioned technical subjects, and other technical subjects which are not mentioned may be clearly understood through the following descriptions by those skilled in the art of the disclosure.

FIG. 1 describes an electronic device that may communicate using packets.

Electronic Device

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural contexts in this document.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 may communicate with other electronic devices 102, 104 by receiving and transmitting packets. For example, the electronic device 101 can receive packets through the communication module 190. The packets can be transferred to an application processor via a communication protocol stack.

Figure 2:
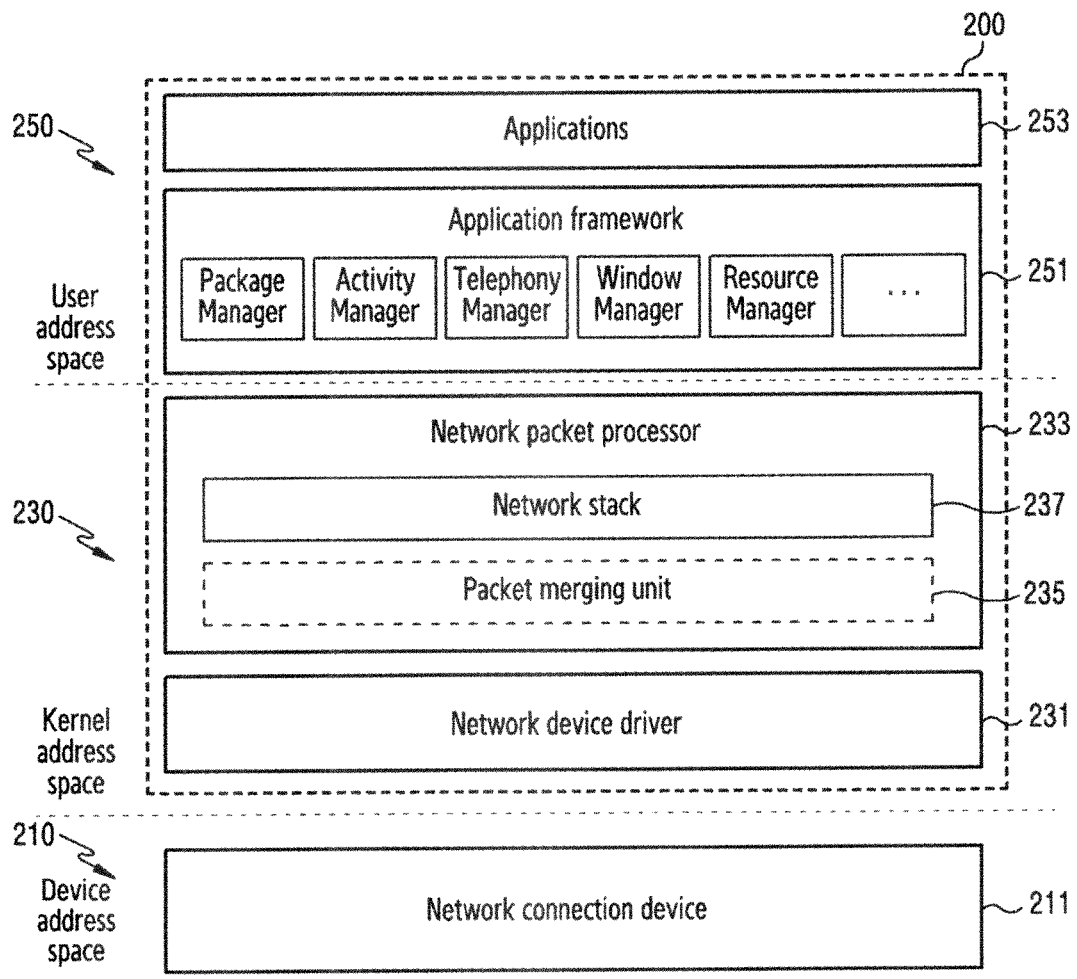
FIG. 2 illustrates a hierarchical structure for processing a packet of the electronic device according to certain embodiments.

FIG. 2 illustrates a hierarchical structure for processing a packet of an electronic device according to certain embodiments.

Referring to FIG. 2, an electronic device (for example, the electronic device 101 of FIG. 1) according to certain embodiments may include a:

1. device area 210 (device address space) for transmitting or receiving a packet,
2. a kernel area 230 (kernel address space),
3. and a user area 250 (user address space).

Operations in the kernel address space 230 and the user address space 250 may be performed by, for example, a processor (for example, the processor 120 of FIG. 1). The processor 120 may perform operations and/or functions in the kernel address space 230 and the user address space 250 through execution of software 200 (for example, the program 140 of FIG. 1). Instructions related to the operations and/or functions in the kernel address space 230 and the user address space 250 may be stored in a memory (for example, the memory 130 of FIG. 1).

The software 200 (for example, the program 140 of FIG. 1) may be largely divided into the kernel address space 230 and the user address space 250 in a memory address space of the memory 130 in which software is executed. The kernel address space 230 may include, for example, a network stack. For example, the software 200 (for example, the program 140 of FIG. 1) may be executed while being divided and stored in the user address area 250 and the kernel address space 230 in the memory space. The kernel area 230 may include, for example, various types of drivers and TCP/IP network stacks. The user address space 250 may include, for example, various types of framework modules and one or a plurality of applications.

The device address space 210 may provide an operation of a hardware device for transmitting or receiving a packet. The device address space 210 may include a network connection device 211 (for example, a network interface card (NIC) or a modem). The network connection device 211 may be a hardware device for physically transmitting or receiving a packet. For example, the network connection device 211 may transmit a transmission packet to the network or receive a reception packet from the network. The transmission packet may be converted into a signal or a bitstream by, for example, the network connection device 211. The transmission packet may include a data packet which the electronic device desires to transmit to another electronic device. The reception packet may include a data packet which the electronic device desires to receive from another electronic device to the electronic device.

In certain embodiments, a received packet is transmitted to the user address space 250. The network stack 237 can be selectively bypassed, based on whether the packet satisfied at least one packet filtering rule.

An application processor (AP) (for example, the processor 120 of FIG. 1) may receive a packet through the network connection device 211 (for example, the communication module 190 of FIG. 1). The AP may transmit the packet through the network connection device 211. For example, the network connection device 211 may be included in a communication processor (CP) (for example, the auxiliary processor 123 of FIG. 1). The AP may transmit a packet to an external electronic device (for example, the electronic device 102 or 104 of FIG. 1 or a server (for example, the server 108 of FIG. 1)) through the network connection device 211. Further, the AP may receive a packet from an external electronic device or a server through the network connection device 211. In this case, the network connection device 211 may provide the received packet to the processor 120.

The kernel address space 230 may be included in an operating system (OS) (for example, the operating system 142 of FIG. 1) of the electronic device. The kernel address space 230 may provide a function for controlling packet processing. The kernel address space 230 may include various modules for processing the received packet. For example, the kernel address space 230 may include a network device driver 231 and a network packet processor 233. The network packet processor 233 may include, for example, a packet-merging unit 235 and a network stack 237.

The network device driver 231 may process the received packet such that the received packet can be processed by a higher layer. The network device driver 231 may process the packet to be suitable for the operating system being executed in the electronic device 101. The network device driver 231 may include one or at least two network device drivers. The network device driver 231 may include at least one device driver among, for example, a modem, a LAN card, Bluetooth, near field communication (NFC), or WiFi. The network device driver 231 may receive a packet according to the communication protocol defined by a manufacturer of the network connection device 211. The network device driver 231 may receive packets from the network connection device 211.

The network device driver 231 may transfer the received packet to the network packet processor 233 or the user address space 250. When the received packet is transferred to the user address space 250, the network device driver 231 may transfer, for example, the received packet to an application framework 251 and/or applications 253 included in the user address space 250. For example, the network device driver 231 may divide the received packets into a first packet (or a packet requiring low latency) which satisfies a predetermined rule and a second packet (or a normal packet) which does not satisfy the predetermined rule through a filter. The filter may classify the received packet as the first packet or the second packet on the basis of filtering rule(s) configured by the applications 253 or at least one other module. Filtering rule(s) may include a condition for at least one of a source IP address, a destination IP address, a source port number, or a destination port number. Filtering rule(s) may be added, changed, and/or removed during runtime.

The network device driver 231 may transfer the first packet to the user address space 250 (for example, at least one application 253) and the second packet to the network packet processor 233. The network device driver 231 may control, for example, the first packet to bypass the network packet processor 233, so as to transfer the first packet to the user address space 250. Hereinafter, for convenience, it is assumed that the network device driver 231 transfers the first packet to the applications 253. However, the same application can be made to a situation in which the first packet is transferred to the applications 253 through the application framework 251.

Transmission of the first packet to the user address space 250 may mean transmission of the first packet to at least one application 253.

The network device driver 231 may store the received packet in at least one buffer (for example, queue buffer). At least one buffer may be configured to be associated with the network packet processor 233 or at least one application 253. The correlation between at least one buffer and the network packet processor 233 or at least one application 253 may be configured and/or changed according to an application being executed in the electronic device 101 or a network service being provided by the electronic device 101.

The network device driver 231 may store the first packet (or packet requiring low latency) which satisfies a predetermined rule in a buffer associated with an application corresponding to the predetermined rule. Meanwhile, the second packet (or normal packet) which does not satisfy the predetermined rule may be stored in a buffer associated with the network packet processor 233.

According to certain embodiments, the network packet processor 233 may include the packet merging unit 235 and the network stack 237. According to an embodiment, the network packet processor 233 may perform at least one of the following operations.

(1) Operation for merging a plurality of reception packets,
(2) Operation for scheduling a plurality of reception packets,
(3) Operation for identifying and calling a protocol corresponding to a packet,
(4) Operation for identifying an IP and/or a port of a packet,
(5) Operation for searching a routing table on the basis of an IP and/or a port of a packet and performing matching based on a search result,
(6) Operation for determining a socket for transmitting a packet, or
(7) Operation for copying a processed packet to the memory address space of the application process The packet merging unit 235 may be omitted according to an embodiment.

The packet merging unit 235 may perform a packet merging function. The packet merging unit 235 may transfer received packets to a higher layer (for example, the network stack 237). The packet merging unit 235 may merge the packets received from the network device driver 231 and transfer the same to the higher layer. The packet merging function may be a scheme for merging (or binding) consecutive packets having the same header information (for example, IP/TCP header information) among the packets received from the network device driver 231 into one packet and transferring the merged packet to the network stack 237. The packet merging function may be performed as a function defined in an OS being executed in the electronic device 101. For example, the packet merging function may be generic receiver offload of Linux™ or receive segment coalescing of Windows™.

The network stack 237 may include a network layer (for example, an internet protocol (IP) and an internet control message protocol (ICMP)) and a transmission layer (a transmission control protocol (TCP) and a user datagram protocol (UDP)). The network stack 237 may receive a packet from the network connection device 211 through the device driver 231 and/or the packet merging unit 235. The network stack 237 may process the received packet such that the reception packet can be processed in the user address space and transfer the processed packet to the user address space. For example, the network stack 237 may perform IP routing in an IP layer and identify a TCP control block in a TCP layer. The network stack 237 may identify an IP address and/or a port number of the received packet. The network stack 237 may transfer the received packet to the corresponding application 253 on the basis of the IP address and/or the port number of the received packet.

The user address space 250 may perform operations using the packets transferred from the kernel address space 230. In the user address space 250, the transferred packets may be used to be suitable for the purpose of applications executed in the user layer. For example, a message may be displayed to the user of the electronic device 101 or a video streaming service may be provided. The user address space 250 may include an application framework 251 and applications 253.

The applications 253 may include an operating system (for example, the operating system 142 of FIG. 1) for controlling resources related to the electronic device and/or may be executed in the operating system. The operating system may include, for example, Android™, Linux™, iOS™, Windows™, Symbian™, Tizen™, or Bada™. The application framework 251 may provide a function required by the applications 253 in common or provide various functions for allowing the applications 253 to use limited system resources within the electronic device to the applications 253.

The applications 253 may directly receive a packet from the software 200 (for example, the network device driver 231 of the program 140 of FIG. 1) or receive a packet through the network packet processor 233. When a network service requiring low latency is detected, the applications 253 may ask the network device driver 231 of low latency and directly receive a first packet (or packet requiring low latency) which satisfies at least one predetermined rule from the network device driver 231.

The applications 253 may receive the first packet from a buffer allocated to the applications 253 among at least one buffer included in the network device driver 231.

The applications 253 may perform a simplified network stack processing operation for the packet received through bypassing of the network packet processor 233, that is, the packet directly received from the network device driver 231. The simplified network stack processing operation may include, for example, an operation of removing a header of the received packet. The applications 253 may remove the header of the received packet and acquire a payload. The applications 253 may perform a predetermined operation using the payload.

It is noted, however that transmitting all packets through the network stack 237 may cause delays. Accordingly, when the packet satisfied at least one packet filtering rule, the network stack 237 can be bypassed. A network device driver 310 can configure at least one packet filtering rule 312. When the at least one packet filtering rule 312 is satisfied, the packet can be transmitted directly to the application 332 in the user address space 330, bypassing the network packet processor 320.

Figure 3:
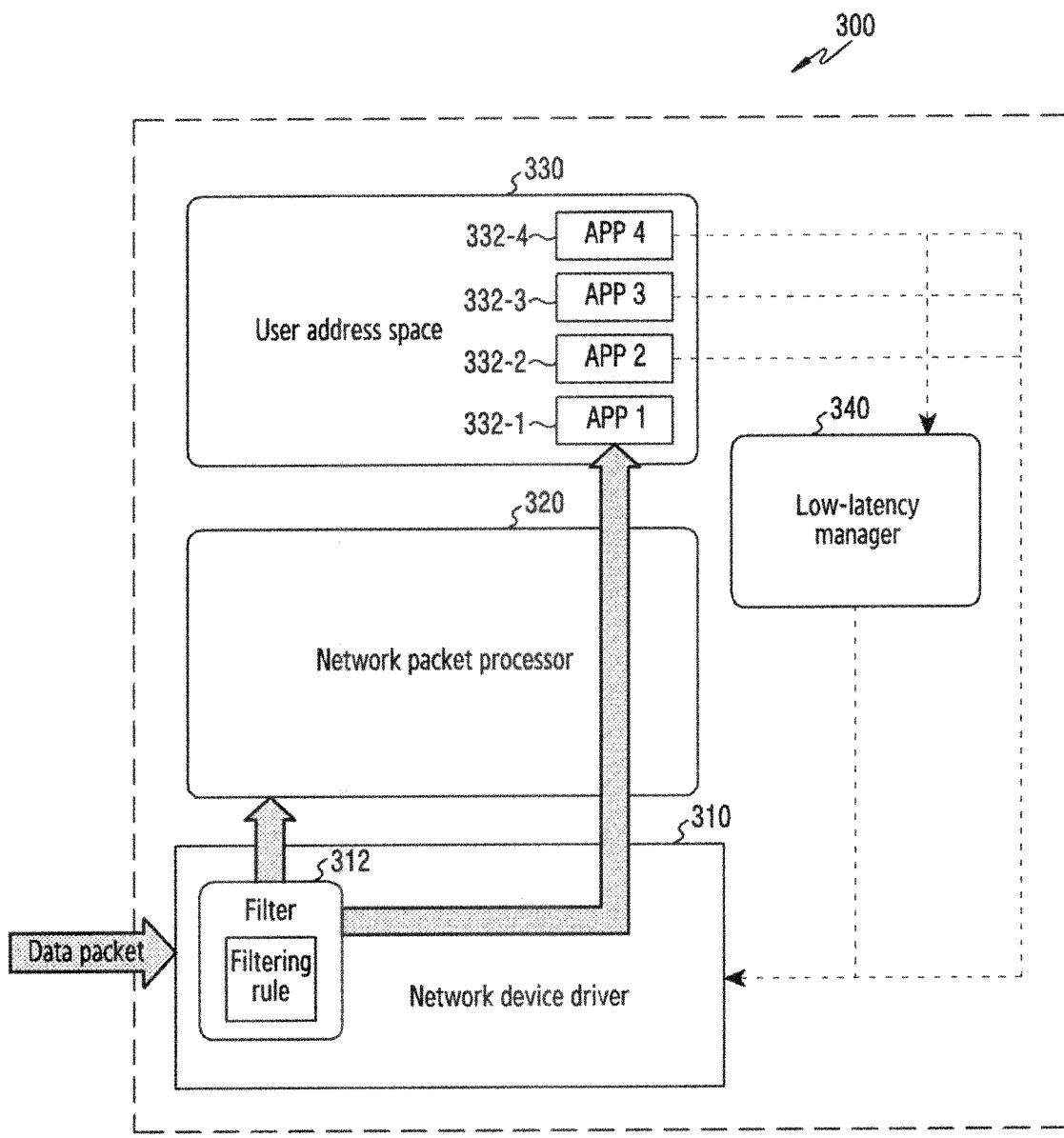
FIG. 3 is a block diagram illustrating transmission of a packet in the electronic device according to certain embodiments.
Figure 4:
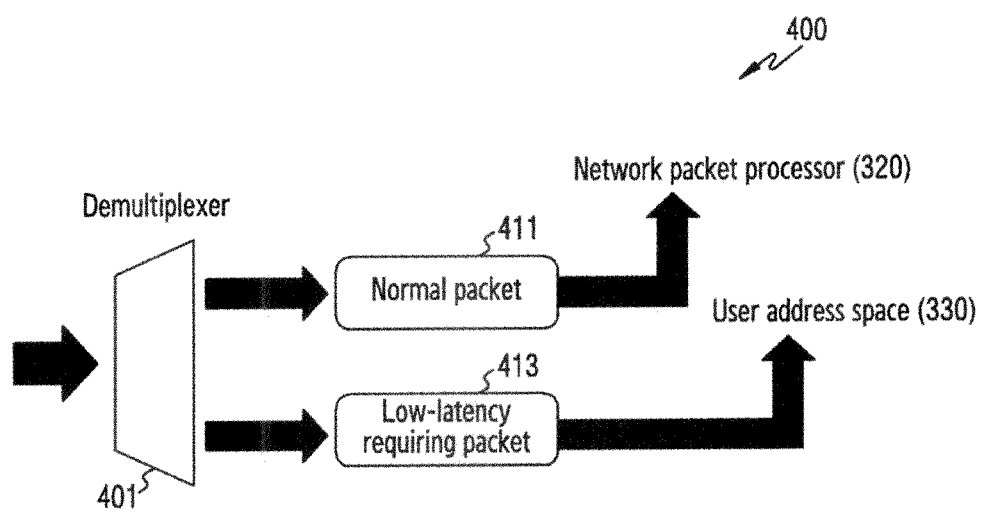
FIG. 4 illustrates an example of filtering packets by the electronic device according to certain embodiments.
Figure 5:
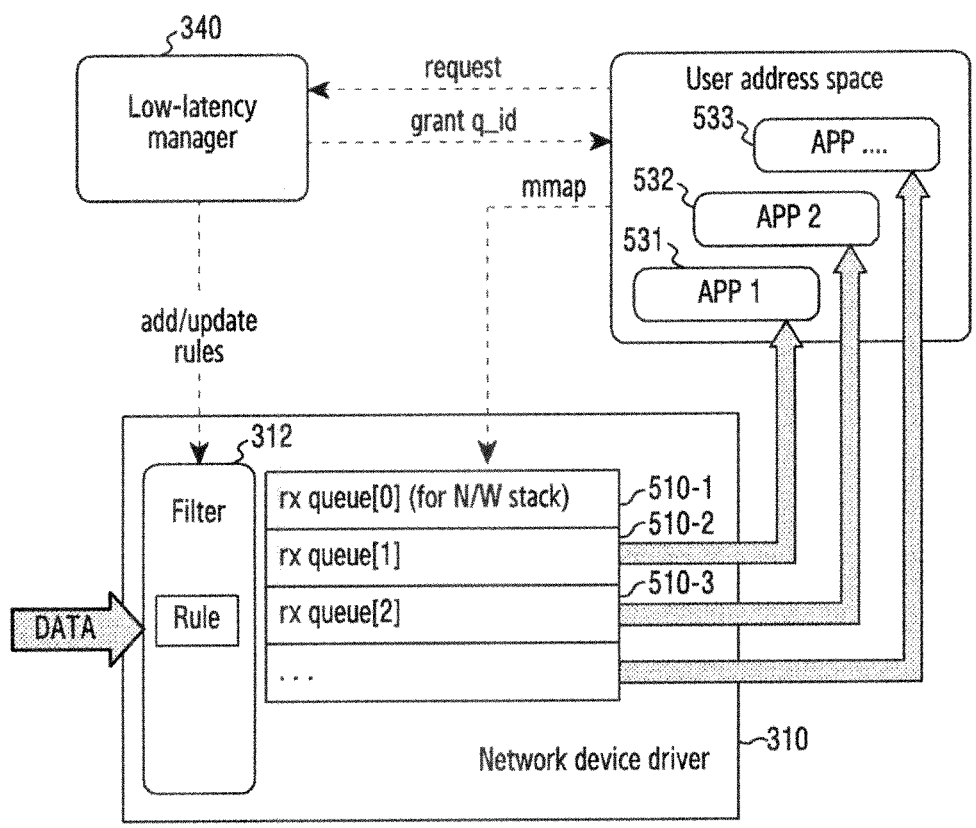
FIG. 5 illustrates the structure of mapping between a memory address space of a network device driver and a memory address space of applications in the electronic device according to certain embodiments.

In certain embodiments, the at least one packet filtering rule 312 can be based on a need for a low-latency guarantee. For example, the applications, App1 . . . App 4 can indicate a need for the low-latency guarantee to a low-latency manager 340. The low-latency manager 340 may provide conditions for filtering a packet of which low-latency transmission should be guaranteed. FIG. 3 is a block diagram 300 illustrating transmission of packets in the electronic device according to certain embodiments. The electronic device may be the electronic device 101 of FIG. 1. Hereinafter, some operations of transmitting packets in FIG. 3 may be described with reference to FIG. 4 and FIG. 5. FIG. 4 illustrates an example of filtering packets by the electronic device according to certain embodiments. FIG. 5 illustrates the structure of mapping between the memory address space of the network device driver (for example, the network device driver 231 of FIG. 2) and the memory address space of the applications (for example, the applications 253 of FIG. 2) in the electronic device according to certain embodiments.

Hereinafter, for convenience, it is assumed that a network device driver 310 transfers the received packet to at least one application 332-1, 332-2, 332-3, and 332-4 (for example, the applications 253 of FIG. 2) included in a user address space 330 (for example, the user address space 250 of FIG. 2). However, it can be sufficiently predicted that the same application can be made to a situation in which the received packet is transferred to at least one application 332-1, 332-2, 332-3, and 332-4 (for example, the applications 253 of FIG. 2) through a framework (for example, the application framework 251 of FIG. 2) included in the user address space 330 (for example, the user address space 250 of FIG. 2).

Referring to FIG. 3, the network device driver 310 (for example, the network device driver 231 of FIG. 2) of the electronic device 101 according to certain embodiments may include a filter 312. The filter 312 may filter the received packet on the basis of filtering rule(s) and transfer the packet to a network packet processor 320 (for example, the network packet processor 233 of FIG. 2) or at least one of applications 332-1 to 332-4 of the user address space 330. Filtering rule(s) may be provided from a low-latency manager 340, the applications 332-1, 332-2, 332-3, and 332-4 of the user address space 330, and/or at least one other module.

Filtering rule(s) may include a condition for filtering a packets meeting conditions indicative of the need of low-latency. For example, conditions relating to a source IP address, a destination IP address, a source port number, or a destination port number may indicate the need for low-latency. Accordingly, filtering rule(s) may include a condition for the source IP address, a destination IP address, a source portion number, and/or a destination port number. Filtering rule(s) may include information (for example, identification information) on an application to which the packet filtered by the filtering rule is transmitted.

The network device driver 310 may receive filtering rule(s). The filtering rule(s) may be received at at least one of a time point at which an application requiring low latency is executed, a time point at which a network session for a network service requiring low latency is connected, a time point at which a server for a network service requiring low latency is connected, or a time point at which a network service requiring low latency is connected.

The network device driver 310 may configure the filter 312 to filter packets which satisfies the filtering rule(s). Filtering rule(s) configured in the filter 312 may be added, changed, and/or removed during runtime. The network device driver 310 may also acquire information on an application (for example, application identification information) corresponding to the received filtering rule when receiving filtering rule(s).

The filter 312 may receive a network packet from the network connection device 211 and determine whether the received packet corresponds to a first packet or a second packet. The first packet may be, for example, a packet which satisfies filtering rule(s). The second packet may be, for example, a packet which does not satisfy filtering rule(s). When the received packet corresponds to the first packet, the filter 312 may transfer the received packet to at least one of the applications 332-1 to 332-4 of the user address space 330. The filter 312 may transfer the received packet to the corresponding application on the basis of identification information of the application acquired along with filtering rule(s). When the received packet corresponds to the second packet, the filter 312 may transfer the received packet to the network packet processor 320. The filter 312 may include, for example, a demultiplexer 401 as illustrated in FIG. 4. In this case, the filter 312 may determine whether the received packet is a normal packet 411 or a low-latency requiring packet 413 through the demultiplexer 401. The demultiplexer 401 may transfer the received packet determined as the normal packet to the network packet processor 320. The demultiplexer 401 may transfer the received packet determined as the low-latency requiring packet 413 to the corresponding application among the plurality of applications 332-1 to 332-4 of the user address space 330.

Filtering rule(s) may be stored in a separate file or included in the network device driver 310 or the low-latency manager 340.

The network packet processor 320 may process the packet received from the network device driver 310 and transfer the packet to at least one of the plurality of applications 332-1, 332-2, 332-3, and 332-4 included in the user address space 330.

The low-latency manager 340 may receive a low-latency guarantee service request signal from the application or at least one other module. The low-latency guarantee service may be a function for making a given application or network service bypass the network packet processor 320. Bypassing the network packet processor 320 enables the network device driver 310 to directly provide the packet to the corresponding application, thus reducing latency. The low-latency guarantee service may packet processing by controlling the packet through, for example, the network device driver 310.

The low-latency guarantee request signal may include at least one piece of information. The information may be criteria for identifying a packet that does or is likely to require low latency or information identifying a network service requiring low latency.

The information related to the packet requiring low latency or the information related to the network service requiring low latency may include, for example, at least one piece of socket information or tuple information corresponding to the packet of which low latency should be guaranteed. The tuple information may include at least one of, for example, a source IP address, a destination IP address, a source port number, or a destination port number.

The low-latency manager 340 may determine filtering rule(s) on the basis of information included in the low-latency guarantee service request signal. The low-latency manager 340 may provide at least one determined filtering rule to the network device driver 310.

The low-latency manager 340 may provide the low-latency guarantee service only to an approved application. The low-latency manager 340 may identify, for example, a predetermined application by a user or an operator (or designer) or an application which satisfies a predetermined condition by a user or an operator (or designer) as the approved application. The approved application may be an application having authority to receive the low-latency guarantee service. When receiving a low-latency guarantee service request signal from, for example, a non-approved application, the low-latency manager 340 may provide a signal indicating that a low-latency guarantee service cannot be provided to the corresponding application.

When receiving a low-latency guarantee service request signal from, for example, an approved application, the low-latency manager 340 may determine filtering rule(s) on the basis of information included in the received low-latency guarantee service request signal. The low-latency manager 340 may provide at least one determined filtering rule to the network device driver 310, so as to perform control to guarantee low latency of the packet corresponding to the approved application.

The low-latency manager 340 may allow reception buffer(s) of the network device driver 310 for an application that transmits the low-latency guarantee service request signal. The low-latency manager 340 may allocate, for example, reception buffer(s) among a reception buffers 510-1 to 510-3 of the network device driver 310 as illustrated in FIG. 5.

Reception buffer(s) may store packets that are for the application. The low-latency manager 340 may provide identification information for the reception buffer(s) that are allocated for the application, to the application.

The low-latency manager 340 may allocate a reception buffer corresponding to, e.g., rx queue[1] 510-2 to a first application (APP 1) 531 and a reception buffer corresponding to rx queue[2] 510-3 to a second application (APP 2) 532 as illustrated in FIG. 5.

The low-latency manager 340 may provide identification information of rx queue[1] 510-2 to the first application 531 and identification information of rx queue[2] 510-3 to the second application (APP 2) 532. The low-latency manager 340 may provide information indicating the correlation between the first application 531 and rx queue[1] 510-2 to the network device driver 310. The network device driver 310 uses the information to queue packets which satisfy filtering rule(s) for the first application 531 in rx queue[1] 510-2. The low-latency manager 340 may provide information indicating the correlation between the second application 532 and rx queue[2] 510-3 to the network device driver 310. The network device driver 310 uses the information to queue packets which satisfy filtering rule(s) for the second application 532 to be stored in rx queue[2] 510-3. Accordingly, when access of an application which is irrelevant to one of a plurality of reception buffers 510-1 to 510-3 (or an application which is not allowed by the low-latency manager 340) to the corresponding buffer is detected, the network device driver 310 may block or reject the access of the non-allowed application.

The low-latency manager 340 may control the number of applications receiving the low-latency guarantee service on the basis of priorities of approved applications. The low-latency manager 340 may provide the low-latency guarantee service for a maximum of N applications. The low-latency manager 340 may receive a signal requesting the low-latency guarantee service from another approved application in the state in which the low-latency guarantee service is provided for N applications. In this case, the low-latency manager 340 may select applications to receive the low-latency service on the basis of priorities of the N applications to which the low-latency service is provided and priorities of other approved applications. The low-latency manager 340 may perform control to provide the low-latency guarantee service for the selected applications. The low-latency manager 340 may provide a low-latency guarantee service stop or rejection signal to non-selected applications.

Each of the applications 332-1 to 332-4 of the user address space 330 may detect a situation in which the low-latency guarantee service is needed. The applications 332-1 to 332-4 may transmit the low-latency guarantee service request signal to the low-latency manager 340 on the basis of the detected result. For example, when a request for executing and connecting a network service having a predetermined characteristic is detected, each of the applications 332-1 to 332-4 may detect a situation in which the low-latency guarantee service is needed.

Each of the applications 332-1 to 332-4 may map at least one reception buffer allocated by the low-latency manager 340 and its own memory address space. Therefore, each of the applications 332-1 to 332-4 may directly receive a packet stored in the reception buffer of the network device driver 310.

Each of the applications 332-1 to 332-4 may perform a simplified network stack processing operation for the packet received through bypass of the network packet processor 320, i.e., the packet received directly from the network device driver 310. The simplified network stack processing operation may include, for example, an operation of removing a header of the received packet. The respective applications 332-1 to 332-4 may support different protocols.

In the above description, the scheme for configuring filtering rule(s) in the filter 312 of the network device driver 310 has been described. That is, it has been described that the application of the user address space detects the situation in which the low-latency guarantee service is needed and transmits the low-latency guarantee service request signal to the low-latency manager 340. However, proposed certain embodiments are not limited thereto. For example, at least one of the low-latency manager 340 or the communication module (for example, the communication module 190 of FIG. 1 or the network connection device 211 of FIG. 2) may detect the situation in which the low-latency guarantee service is needed on the basis of at least one piece of characteristic information for a data transmission path of a network service or network service identification information.

The characteristic information for the data transmission path of the network service may include at least one of a network slice, a data network name (DNN), a session and service continuity (SSC) mode, a UE route selection policy (URSP), quality of service (QoS) information of network bearer or flow, a local area data network (LADN), or IPv6 multi-homing (selective traffic routing). The network service identification information may include application identification information or tuple information (for example, source IP address information, destination IP address information, a source port number, or a destination port number). The characteristic information for the data transmission path of the network service may be acquired from information preconfigured in the UE or received from the network when the data path for the network service is generated. The characteristic information for the data transmission path of the network service or the network service identification information may be changed by an executed application.

The low-latency manager 340 or the communication module 190 may detect a predetermined network service (for example, a mobile edge computing (MEC) service) requiring the low-latency guarantee service on the basis of at least one piece of the characteristic information for the data transmission path of the network service or the network service identification information and perform control to configure filtering rule(s) of the predetermined network service.

An electronic device may include a communication module (for example the communication module 190 of FIG. 1 and/or the network connection device 211 of FIG. 2), at least one processor (for example, the processor 120 of FIG. 1), and a memory (for example, the memory 130 of FIG. 1) electrically connected to the at least one processor 120, and the memory 130 may store instructions causing the at least one processor 120 to, when executed, configure at least one packet filtering rule, determine whether a packet received through the communication module 190 or 211 satisfies the at least one configured packet filtering rule, control the packet to be transmitted to a user address space (for example, the user address space 250 of FIG. 2) allocated to the memory 130 when the packet satisfies the at least one configured packet filtering rule, and control the packet to be transmitted to the user address space 250 through a network stack (for example, the network stack 237 or the network packet processor 233 of FIG. 2) included in a kernel address space (for example, the kernel address space 230 of FIG. 2) allocated to the memory 130 when the packet does not satisfy the at least one configured packet filtering rule.

The instructions may cause the at least one processor 120 to control the packet to bypass the network stack 237 and to be transmitted from a network device driver (for example, the network device driver 231 of FIG. 2) to the application 253 included in the user address space 250 when the packet satisfies the at least one configured packet filtering rule.

A header of the packet satisfying the at least one configured packet filtering rule may be removed from the application 253 included in the user address space 250.

The instructions may cause the at least one processor 120 to, when the packet satisfies the at least one configured packet filtering rule, store the packet in a first reception buffer allocated to the application 253 included in the user address space 250 corresponding to the at least one packet filtering rule among a plurality of reception buffers (for example, the reception buffers 510-1 to 510-3 of FIG. 5) included in the network device driver 231.

The first reception buffer may be mapped to a memory address space of the application 253 corresponding to the at least one packet filtering rule.

The packet stored in the first reception buffer may be transmitted to a memory address space of the application 253 mapped to the first reception buffer.

The instructions may cause the at least one processor 120 to configure the at least one packet filtering rule in a filter of the network device driver 231 and allocate the first reception buffer to the application 253 corresponding to the at least one configured filtering rule.

The packet filtering rule(s) may include conditions for at least one of source IP address information, destination IP address information, a source port number, or a destination port number.

The instructions may cause the at least one processor 120 to detect a network service connection corresponding to the application 253 included in the user address space 250, detect a situation in which a low-latency guarantee service for a packet corresponding to the application 253 is needed based on at least one of identification information of the network service or characteristic information for a data transmission path of the network service, and acquire the at least one packet filtering rule from the application 253.

The instructions may cause the processor 120 to determine whether the low-latency guarantee service for the packet corresponding to the application 253 is provided based on at least one of a priority of the application 253 or authority of the applications 253.

According to certain embodiments, the network device driver(s) 231 or 310 may configured filtering rule(s) to be used for packet filtering. Then, based on whether packets satisfy the filtering rule(s), the packets can either be transmitted through the network stack 235 or transmitted directly to the user address space.

Figure 6:
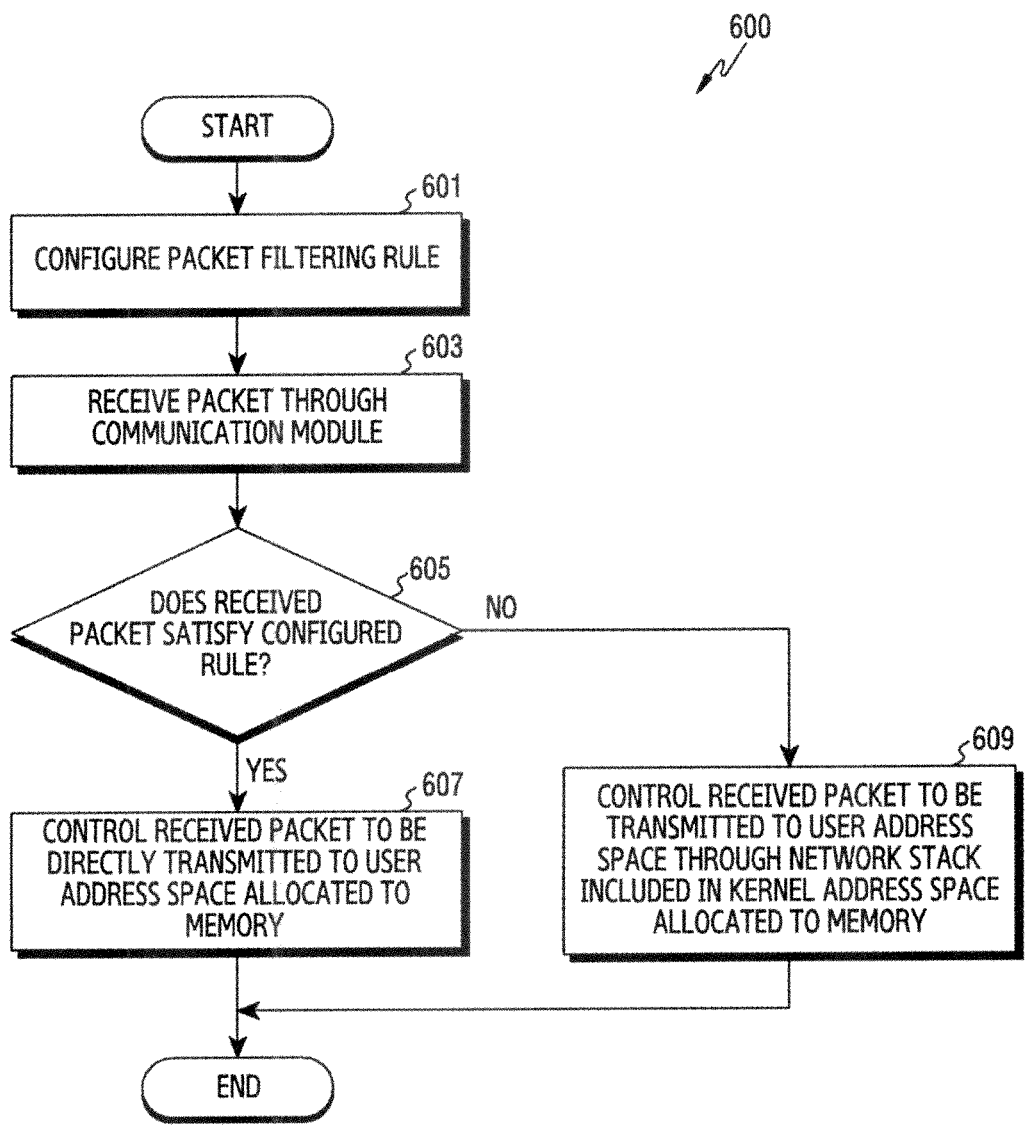
FIG. 6 is a flowchart illustrating a process in which the electronic device filters a packet according to certain embodiments.

FIG. 6 is a flowchart 600 illustrating a process in which the electronic device filters and processes packets according to certain embodiments. The electronic device performing the operation of FIG. 6 may be the electronic device 101 of FIG. 1.

Referring to FIG. 6, the electronic device (for example, the processor 120 of FIG. 1 and/or the network device drivers 231 and 310 of FIGS. 2 and 3) according to certain embodiments may configure filtering rule(s) to be used for packet filtering in operation 601.

The network device driver 231 or 310 may receive filtering rule(s) from a low-latency manager (for example, the low latency manager 340 of FIG. 3) and/or an application and configure a filter (for example, the filter 312 of FIG. 3) on the basis of at least one received filtering rule. Filtering rule(s) may include a condition for a packet of which low-latency transmission is guaranteed, for example, a condition for at least one of a source IP address, a destination IP address, a source port number, or a destination port number. Filtering rule(s) may additionally include information (for example, identification information) on an application to which the packet filtered by each filtering rule is transmitted.

When a situation in which the low-latency guarantee service is needed is detected, the network device driver 231 or 310 may acquire filtering rule(s). The situation in which the low-latency guarantee service is needed may be detected by at least one of, for example, a low-latency manager (for example, the low-latency manager 340 of FIG. 3), a communication module (for example, the communication module 190 of FIG. 1 and/or the network connection device 211 of FIG. 2), or the application. The situation in which the low-latency guarantee service is needed may be determined on the basis of a least one piece of characteristic information for a data transmission path of a network service or network service identification information.

In operation 603, the electronic device (for example, the processor 120) and/or the network device driver 231 or 310 may receive at least one packet through the communication module (for example, the communication module 190) and/or the network connection device 211. For example, the network device driver 231 or 310 may receive the packet received from the network connection device 211 through the network.

In operation 605, the electronic device (for example, the processor 120) and/or the network device driver 231 or 310 may determine whether the received packet satisfies filtering rule(s). According to an embodiment, the network device driver 231 or 310 may determine whether the received packet satisfies filtering rule(s) through the filter 312. When the received packet satisfies filtering rule(s), the network device driver 231 or 310 may determine the received packet as a first packet of which low-latency transmission should be guaranteed (or a packet requiring low latency). When the received packet does not satisfy filtering rule(s), the network device driver 231 or 310 may determine the received packet as a second packet which does not require a low-latency guarantee (or a normal packet).

When the received packet satisfies filtering rule(s), the electronic device (for example, the processor 120) and/or the network device driver 231 or 310 may perform control to transmit the received packet to a user address space (for example, the user address space 250 of FIG. 2 and/or the user address space 330 of FIG. 3) in operation 607. The electronic device (for example, the processor 120) and/or the network device driver 231 or 310 may perform control to transmit, for example, the received packet to one or a plurality of applications (the applications 253 of FIG. 2 or the applications 332-1, 332-2, 332-3, and 332-4 of FIG. 3) included in the user address space 250 or 330.

When the received packet satisfies filtering rule(s), the network device driver 231 or 310 may not transmit the received packet to a network packet processor (for example, the network packet processor 233 of FIG. 2 and/or the network packet processor 320 of FIG. 3). In this case, the network device driver 231 or 310 may transmit the received packet to an application corresponding to the corresponding filter rule, bypassing the network packet processor 320.

The network device driver 231 or 310 may identify an application corresponding to the filtering rule satisfied by the received packet and store the reception packet in a reception buffer allocated to the identified application (or a reception buffer having the correlation with the identified application) among a plurality of reception buffers included in the network device driver 231 or 310. The reception buffer may be mapped to a memory address space of the corresponding application. In this case, the received packet stored in the reception buffer may be provided to the corresponding application through bypass of the network packet processor 233.

When the received packet does not satisfy filtering rule(s), the electronic device (for example, the processor 120 and/or the network device driver 231 or 310) may perform control to transmit the received packet to the application through a network stack (for example, the network stack 237 of FIG. 2) included in a network packet processor (for example, the network packet processor 233 of FIG. 2 and/or the network packet processor 320 of FIG. 3) in operation 609.

The network device driver 231 or 310 may transmit the received packet to the network packet processor 233 or 320. According to an embodiment, the network device driver 231 or 310 may store the received packet in a reception buffer allocated to the network packet processor 233 or 320 (or a reception buffer having the correlation with the network packet processor 233 or 320) among a plurality of reception buffers included in the network device driver 231 or 310.

FIG. 6 assumes that, when the received packet satisfies filtering rule(s), the network device driver 231 or 310 transmits the received packet to an application corresponding to the corresponding filtering rule.

In another embodiment, when the received packet satisfies filtering rule(s), the network device driver 231 or 310 may perform control to transmit the received packet to an application framework (for example, the application framework 251 of FIG. 2) included in the user address space 250 or 330. In this case, the application framework (for example, the application framework 251 of FIG. 2) may transmit the packet received from the network device driver 231 or 310 to the application corresponding to the corresponding filtering rule.

Figure 7:
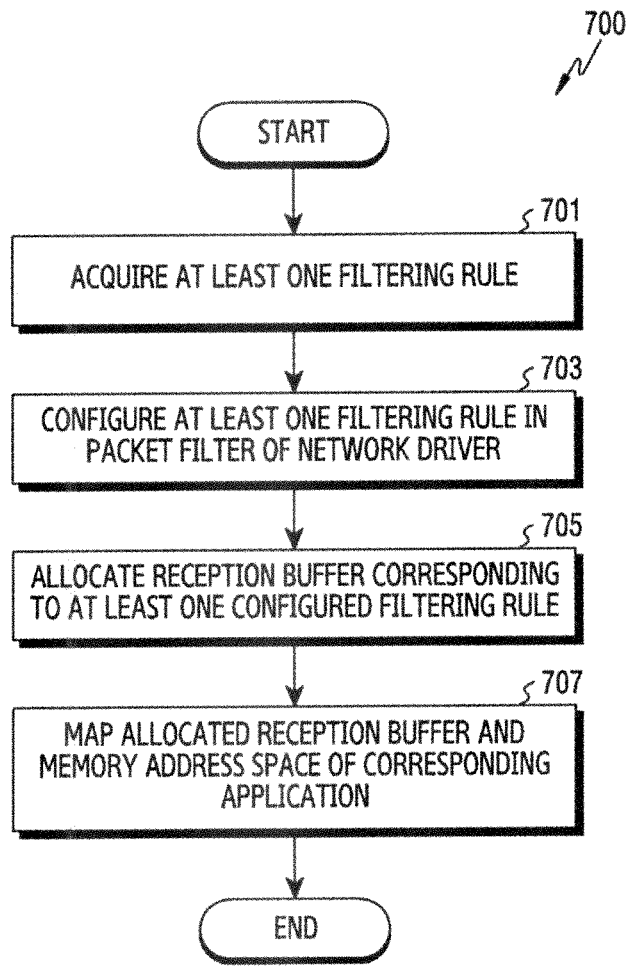
FIG. 7 is a flowchart illustrating a process in which the electronic device configures a packet filtering rule according to certain embodiments.

FIG. 7 is a flow chart for configuring a packet filtering rule. The packet filtering rule can be received from the low-latency manager 340. The low-latency manager 340 may allocated reception buffers to each filter rule, and map the allocated reception buffer and memory address space of the corresponding application.

FIG. 7 is a flowchart 700 illustrating a process in which the electronic device configures a packet filtering rule according to certain embodiments. The electronic device performing the operation of FIG. 7 may be the electronic device 101 of FIG. 1. Operations of FIG. 7 described below may be at least some of the detailed operation of operation 601 of FIG. 6.

Referring to FIG. 7, the electronic device (for example, the processor 120 of FIG. 1 and/or the low-latency manager 340 of FIG. 3) according to certain embodiments may acquire filtering rule(s) in operation 701.

The low-latency manager 340 may acquire filtering rule(s) from applications (for example, the applications 253 of FIG. 2) or a communication module (for example, the communication module 190 of FIG. 1 and/or the network connection device 211 of FIG. 2) which detects a situation in which a low-latency guarantee service is needed. For example, the low-latency manager 340 may receive a low-latency guarantee service request signal including at least one of filtering rule(s) or information for configuring filtering rule(s) from the applications 253 or the communication module 190 or 211.

The low-latency manager 340 may detect a situation in which the low-latency guarantee service is needed on the basis of at least one piece of characteristic information for a data transmission path of a network service or network service identification information. In the situation in which the low-latency guarantee service is needed, the low-latency manager 340 may make a request for filtering rule(s) to the corresponding application 253 or the communication module 190 or 211 and receive a low-latency guarantee service request signal including at least one filtering rule in response thereto.

In operation 703, the electronic device (for example, the processor 120 and/or the low-latency manager 340) may configure at least one filtering rule in a packet filter (for example, the filter 312 of FIG. 3) of a network device driver (for example, the network device drivers 231 and 310 of FIGS. 2 and 3). For example, the low-latency manager 340 may provide filtering rule(s) to the network device driver 231 or 310. The network device driver 231 or 310 may configure the filter 312 on the basis of filtering rule(s) received from the low-latency manager 340. Filtering rule(s) may be added, changed, and/or removed on the basis of at least one of additional execution of an application, a change in an executed application, or a user input during runtime.

In operation 705, the electronic device (for example, the processor 120 and/or the low-latency manager 340) may allocate a reception buffer of the network device driver 231 or 310 to an application corresponding to filtering rule(s).

The low-latency manager 340 may allow at least one reception buffer of the network device driver 310 for an application transmitting the low-latency guarantee service request signal. For example, the low-latency manager 340 may determine at least one reception buffer among a plurality of reception buffers 510-1 to 510-3 of the network device driver 310 as illustrated in FIG. 5 as a reception buffer to store a packet of the application transmitting a low-latency guarantee service request signal. The low-latency manager 340 may provide identification information of the allocated reception buffer to the corresponding application, so as to control the reception buffer and the application to have the correlation therebetween. For example, the low-latency manager 340 may allocate a reception buffer corresponding to rx queue[1] 510-2 to the first application (APP 1) 531 and provide identification information of rx queue[1] 510-2 to the first application 531. The low-latency manager 340 may provide information indicating the correlation between the first application 531 and rx queue[1] 510-2 to the network device driver 310, so as to control a packet which satisfies filtering rule(s) corresponding to the first application 531 to be stored in rx queue[1] 510-2.

In operation 707, the electronic device (for example, the processor 120 and/or the applications 253) may map the allocated reception buffer and a memory address space of the application. According to an embodiment, the applications 253 of the user address space may receive information on the reception buffer allocated thereto from the low-latency manager 340 and map the received information on the reception buffer and the memory address space of the corresponding application. For example, the applications 253 may map the identification information of the allocated reception buffer and the memory address space of the corresponding application through a memory map.

Figure 9A:
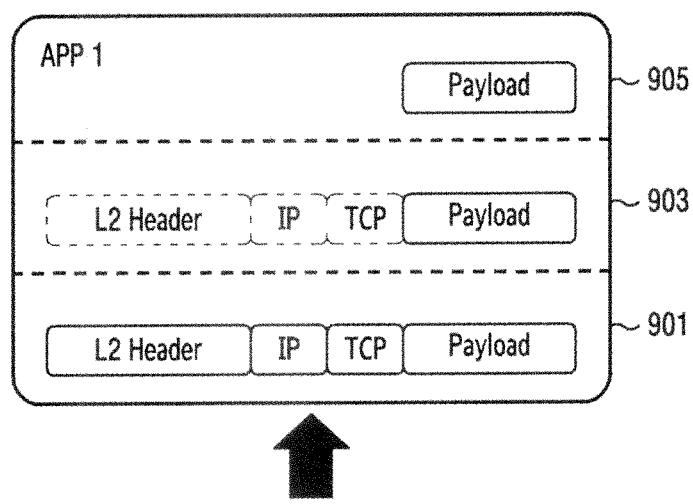
FIGS. 9A to 9C illustrate examples in which the electronic device processes packets using applications according to certain embodiments.
Figure 9B:
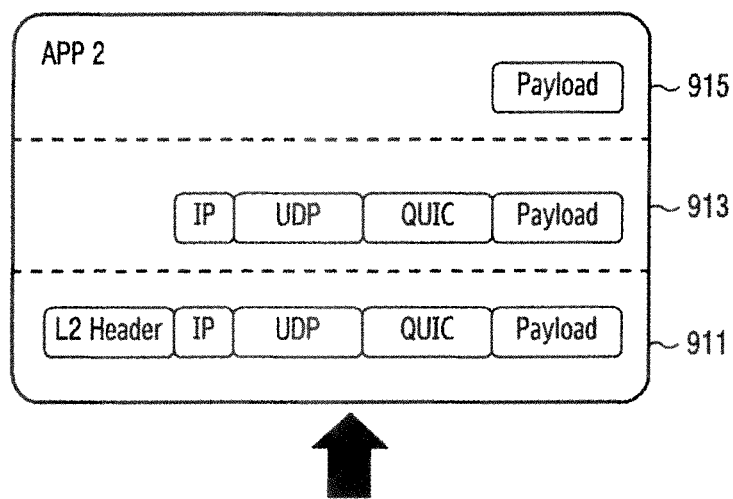
Figure 9C:
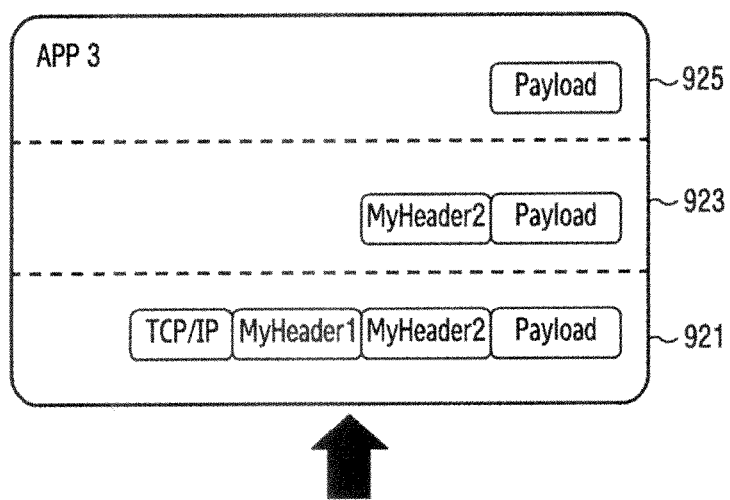

In certain embodiments, the headers of the packets that satisfy the packet filtering rule(s) may be removed, according to which application the packet is for. For example, in FIG. 9A, the L2 header and IP header are removed for App 1. In FIG. 9B, the L2 header is removed for App 2. In FIG. 9C, the TCP/IP header and the MyHeader 1 are removed for App 3.

Figure 8:
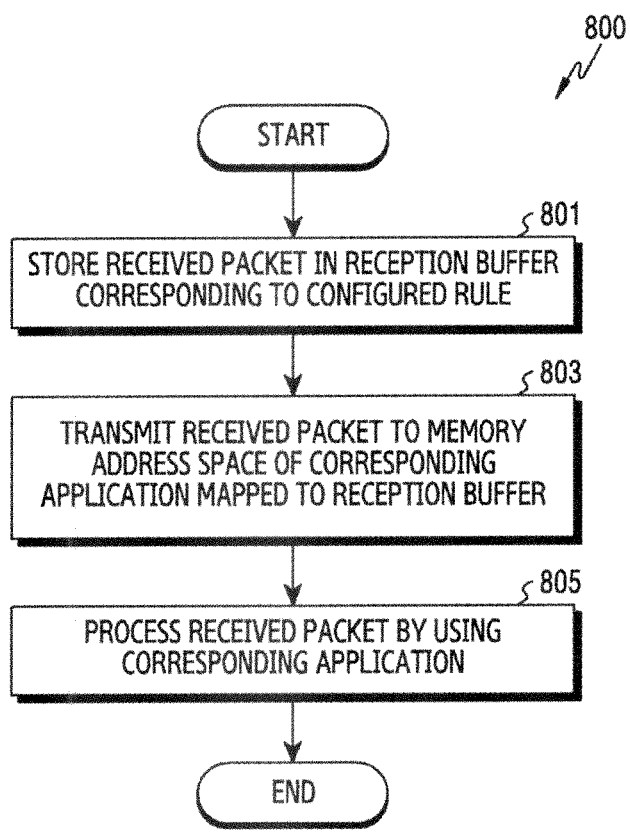
FIG. 8 is a flowchart illustrating a process in which the electronic device processes a packet requiring low-latency transmission according to certain embodiments.

FIG. 8 is a flowchart 800 illustrating a process in which the electronic device processes packets requiring low-latency transmission according to certain embodiments. The electronic device performing the operation of FIG. 8 may be the electronic device 101 of FIG. 1. Operations of FIG. 8 described below may be at least some of the detailed operation of operation 607 of FIG. 6. Some operations of FIG. 8 described below are described with reference to FIGS. 9A to 9B. FIGS. 9A to 9C illustrate examples in which the electronic device processes packets using applications according to certain embodiments.

Referring to FIG. 8, the electronic device (for example, the processor 120 of FIG. 1 and/or the network device drivers 231 and 310 of FIGS. 2 and 3) according to certain embodiments may store a received packet in a reception buffer corresponding to a configured filtering rule in operation 801.

According to an embodiment, the network device driver 231 or 310 may identify a reception buffer corresponding to a received packet which satisfies filtering rule(s) and store the received packet in the identified reception buffer. For example, the network device driver 231 or 310 may identify identification information of an application to which the received packet is transmitted on the basis of the filtering rule satisfied by the received packet. The network device driver 231 or 310 may identify a reception buffer associated with the identified identification information of the application among a plurality of reception buffers and store the received packet in the identified reception buffer.

In operation 803, the electronic device (for example, the processor 120 and/or the network device driver 231 or 310) may transmit the received packet to a memory address space of the corresponding user space area 250 mapped to the reception buffer. The received packet stored in the reception buffer of the network device driver 231 or 310 may be transmitted to the memory address space of the user address space 250 mapped to the reception buffer through the memory map. In this case, the received packet stored in the reception buffer may be transmitted through bypass of a network packet processor (for example, the network packet processor 233 of FIG. 2 and/or the network packet processor 320 of FIG. 3). Accordingly, the received packet which satisfies filtering rule(s) may be directly transmitted to a user address space (for example, the user space address 250 of FIG. 2 and/or the user space address 330 of FIG. 3) by the network packet processor 233 or 320. The user address space 250 or 330 may include applications (for example, the applications 253 of FIG. 2 and/or the applications 332-1, 332-2, 332-3, and 332-4 of FIG. 3) and an application framework (for example, the application framework 251 of FIG. 2). In this case, the received packet may be transmitted to the applications 253 and/or 332-1, 332-2, 332-3, and 332-4 and/or the application framework 251 included in the user address spaces 250 and 330. Hereinafter, for convenience of description, it is assumed that the received packet is transmitted to the applications 253 and/or 332-1, 332-2, 332-3, and 332-4. However, the same application can be made to the case in which the received packet is transmitted to the applications 253 and/or 332-1, 332-2, 332-3, and 332-4 through the application framework 251.

In operation 805, the electronic device (for example, the processor 120) may process the received packet by using the corresponding application 253. According to an embodiment, the processor 120 may perform a simplified network stack processing operation by using the applications 253. The simplified network stack processing operation may include, for example, an operation of removing a header of the received packet. The applications 253 may remove a header of the received packet to acquire a payload and perform a predetermined operation by using the acquired payload.

The respective applications 253 may support different protocols. For example, the respective applications support different protocols, so as to process packets in different formats as illustrated in FIGS. 9A to 9C. For example, the first application (APP 1) may receive a packet including a Layer 2 (L2) header, an Internet Protocol (IP) header, a Transmission Control Protocol (TCP) header, and a payload as indicated by reference numeral 901 and perform simplified network stack processing as illustrated in FIG. 9A. In this case, it is possible to acquire the payload as indicated by reference numeral 905 by removing the header part (L2 header, IP header, and TCP header) except for the payload from the received packet as indicated by reference numeral 903.

In another example, the applications may be executed through only implementation of the end of the application even though a kernel is not supported when a header structure other than the conventional header structure such as the TCP header, the IP header, the HTTP header, and the like is used. As illustrated in FIG. 9B, the second application (APP 2) may receive a packet including an L2 header, an IP header, a UDP header, a QUIC header, and e payload as indicated by reference numeral 911 and remove the header part (L2 header, IP header, UDP header, and QUIC header) except for the payload from the received packet as indicated by reference numeral 913, so as to acquire the payload as indicated by reference numeral 915.

In another example, as illustrated in FIG. 9C, the third application (APP 3) may receive a packet including a TCP/IP header, headers (MyHeader1 and MyHeader2) supporting a protocol manufactured directly by an application designer, and a payload as indicated by reference numeral 921 and remove the headers (TCP/IP header, MyHeader1, and MyHeader2) from the received packet as indicated by reference numeral 923, so as to acquire the payload as indicated by reference numeral 925. In the embodiments of FIGS. 6 to 8, the respective operations may be performed sequentially, but the sequential performance is not necessary. For example, orders of the operations may be changed, and at least two operations may be performed in parallel.

According to certain embodiments, an electronic device comprises: a communication module; at least one processor; and a memory electrically connected to the at least one processor, wherein the memory stores instructions, that when executed, cause the at least one processor to perform a plurality of operations, the plurality of operations comprising: determining whether a packet received through the communication module satisfies at least one packet filtering rule, transmitting the packet directly to a user address space allocated to the memory, bypassing a network stack included in a kernel address space allocated to the memory, when the packet satisfies the at least one packet filtering rule, and transmitting the packet to the user address space through the network stack included in the kernel address space allocated to the memory when the packet does not satisfy the at least one packet filtering rule.

According to certain embodiments, the plurality of operations further comprises removing a header of the packet from an application included in the user address space, when the packet satisfies the at least one packet filtering rule.

According to certain embodiments, the plurality of operations further comprises: when the packet satisfies the at least one packet filtering rule, storing the packet in a first reception buffer allocated to an application included in the user address space corresponding to the at least one packet filtering rule among a plurality of reception buffers included in a network device driver, wherein the first reception buffer is mapped to a memory address space of the application corresponding to the at least one packet filtering rule, and wherein the packet stored in the first reception buffer is transmitted to the memory address space of the application mapped to the first reception buffer.

According to certain embodiments, the plurality of operations further comprises: configuring a filter of the network device driver with the at least one packet filtering rule; and allocating the first reception buffer to the application corresponding to the at least one packet filtering rule.

According to certain embodiments, the at least one packet filtering rule comprises conditions for at least one of source IP address information, destination IP address information, a source port number, or a destination port number.

According to certain embodiments, the plurality of operations further comprises: detecting a connection for a network service corresponding to an application included in the user address space, detecting that a low-latency guarantee service for a packet corresponding to the application is needed based on at least one of identification information of the network service or characteristic information for a data transmission path of the network service, acquiring the at least one packet filtering rule from the application, and determining whether the low-latency guarantee service for the packet corresponding to the application is provided based on at least one of a priority of the application or authority of the application.

According to certain embodiments, a method of operating an electronic device (for example, the electronic device 101 of FIG. 1) may include determining whether a packet received through a communication module satisfies at least one packet filtering rule, transmitting the packet directly to a user address space (for example, the user address space 250 of FIG. 2) allocated to a memory by bypassing a network stack included in a kernel address space allocated to the memory, when the packet satisfies the at least one packet filtering rule, and transmitting the packet to the user address space 250 through the network stack (for example, the network stack 237 of FIG. 2) included in the kernel address space (for example, the kernel address space 230 of FIG. 2) allocated to the memory when the packet does not satisfy the at least one packet filtering rule.

According to an embodiment, the transmitting of the packet to the user address space 250 by bypassing the network stack may include controlling the packet to bypass the network stack 237 and to be transmitted from a network device driver (for example, the network device driver 231 of FIG. 2) to the application 253 included in the user address space.

According to an embodiment, the method may include removing a header of the packet transmitted from the network device driver 231 from the application 253, when the packet satisfies the at least one packet filtering rule.

According to an embodiment, the method may include storing the packet in a first reception buffer allocated to an application included in the user address space corresponding to the at least one packet filtering rule among a plurality of reception buffers (for example, rx queue 510-1 to 510-3 of FIG. 5) included in a network device driver 231.

According to an embodiment, the first reception buffer may be mapped to a memory address space of an application corresponding to the at least one packet filtering rule.

According to an embodiment, the packet stored in the first reception buffer may be transmitted to a memory address space of the application mapped to the first reception buffer.

According to an embodiment, the method may include configuring the at least one packet filtering rule in a filter of the network device driver 231 and allocating the first reception buffer to the application corresponding to the at least one filtering rule.

According to an embodiment, the at least one packet filtering rule may include conditions for at least one of source IP address information, destination IP address information, a source port number, or a destination port number.

According to an embodiment, the method may include detecting a connection for a network service corresponding to an application included in the user address space 250, detecting that a low-latency guarantee service for a packet corresponding to the application is needed based on at least one of identification information of the network service or characteristic information for a data transmission path of the network service, and acquiring the at least one packet filtering rule from the application.

According to an embodiment, the method may further include determining whether the low-latency guarantee service for the packet corresponding to the application is provided based on at least one of a priority of the application or authority of the applications.

According to certain embodiments, a non-transitory computer readable medium stores a plurality of instructions wherein execution of the plurality of instructions by one or more processors causes the one or more processors to perform a plurality of operations comprising: determining whether a packet received through a communication module satisfies at least one packet filtering rule; transmitting the packet directly to a user address space allocated to a memory by bypassing a network stack included in a kernel address space allocated to the memory, when the packet satisfies the at least one packet filtering rule; and transmitting the packet to the user address space through the network stack included in the kernel address space allocated to the memory when the packet does not satisfy the at least one packet filtering rule.

According to certain embodiments, the plurality of operations further comprises: removing a header of the packet transmitted from a network device driver from an application included in the user address space, when the packet satisfies the at least one packet filtering rule.

According to certain embodiments, the plurality of operations further comprises: storing the packet in a first reception buffer allocated to an application included in the user address space corresponding to the at least one packet filtering rule among a plurality of reception buffers included in a network device driver, wherein the first reception buffer is mapped to a memory address space of the application corresponding to the at least one packet filtering rule, and wherein the packet stored in the first reception buffer is transmitted to the memory address space of the application mapped to the first reception buffer.

According to certain embodiments, the plurality of operations further comprises: configuring the at least one packet filtering rule in a filter of the network device driver; and allocating the first reception buffer to the application corresponding to the at least one packet filtering rule.

According to certain embodiments, the at least one packet filtering rule comprises conditions for at least one of source IP address information, destination IP address information, a source port number, or a destination port number.

According to certain embodiments, the plurality of operations further comprises: detecting a connection for a network service corresponding to an application included in the user address space; detecting that a low-latency guarantee service for a packet corresponding to the application is needed based on at least one of identification information of the network service or characteristic information for a data transmission path of the network service; and acquiring the at least one packet filtering rule from the application.

According to certain embodiments, the plurality of operations further comprises: determining whether the low-latency guarantee service for the packet corresponding to the application is provided based on at least one of a priority of the application or authority of the application.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Although certain embodiments have been described with a degree of particularity, it shall be understood that the statement that the non-limiting embodiments, can be modified, with certain elements omitted, substituted, or replaced without departing form the spirit or scope of this document as set forth in the following claims, and equivalents thereof.

The invention claimed is:

1. An electronic device comprising:
a communication module;
at least one processor; and
a memory electrically connected to the at least one processor,
wherein the memory stores instructions, that when executed, cause the at least one processor to perform a plurality of operations, the plurality of operations comprising:
detecting a connection for a network service corresponding to an application included in a user address space,
detecting that a low-latency guarantee service for a packet corresponding to the application is needed,
based on detection of the low-latency guarantee service, acquiring at least one packet filtering rule from the application,
determining whether a packet received through the communication module satisfies the at least one packet filtering rule,
transmitting the packet directly to the user address space allocated to the memory, bypassing a network stack included in a kernel address space allocated to the memory, when the packet satisfies the at least one packet filtering rule, and
transmitting the packet to the user address space through the network stack included in the kernel address space allocated to the memory when the packet does not satisfy the at least one packet filtering rule.

2. The electronic device of claim 1, wherein the plurality of operations further comprises removing a header of the packet from an application included in the user address space, when the packet satisfies the at least one packet filtering rule.

3. The electronic device of claim 1, wherein, the plurality of operations further comprises:
when the packet satisfies the at least one packet filtering rule, storing the packet in a first reception buffer allocated to an application included in the user address space corresponding to the at least one packet filtering rule among a plurality of reception buffers included in a network device driver,
wherein the first reception buffer is mapped to a memory address space of the application corresponding to the at least one packet filtering rule, and
wherein the packet stored in the first reception buffer is transmitted to the memory address space of the application mapped to the first reception buffer.

4. The electronic device of claim 3, wherein the plurality of operations further comprises:
configuring a filter of the network device driver with the at least one packet filtering rule; and
allocating the first reception buffer to the application corresponding to the at least one packet filtering rule.

5. The electronic device of claim 1, wherein the at least one packet filtering rule comprises conditions for at least one of source IP address information, destination IP address information, a source port number, or a destination port number.

6. The electronic device of claim 1, wherein the plurality of operations further comprises:
detecting that the low-latency guarantee service for a packet corresponding to the application is needed based on at least one of identification information of the network service or characteristic information for a data transmission path of the network service,
determining whether the low-latency guarantee service for the packet corresponding to the application is provided based on at least one of a priority of the application or authority of the application.

7. A method of operating an electronic device, the method comprising:
detecting a connection for a network service corresponding to an application included in a user address space;
detecting that a low-latency guarantee service for a packet corresponding to the application is needed;
based on detection of the low-latency guarantee service, acquiring at least one packet filtering rule from the application;
determining whether a packet received through a communication module satisfies at the least one packet filtering rule;
transmitting the packet directly to the user address space allocated to a memory by bypassing a network stack included in a kernel address space allocated to the memory, when the packet satisfies the at least one packet filtering rule; and
transmitting the packet to the user address space through the network stack included in the kernel address space allocated to the memory when the packet does not satisfy the at least one packet filtering rule.

8. The method of claim 7, further comprising:
removing a header of the packet transmitted from a network device driver from an application included in the user address space, when the packet satisfies the at least one packet filtering rule.

9. The method of claim 7, further comprising:
storing the packet in a first reception buffer allocated to an application included in the user address space corresponding to the at least one packet filtering rule among a plurality of reception buffers included in a network device driver,
wherein the first reception buffer is mapped to a memory address space of the application corresponding to the at least one packet filtering rule, and
wherein the packet stored in the first reception buffer is transmitted to the memory address space of the application mapped to the first reception buffer.

10. The method of claim 9, further comprising:
configuring the at least one packet filtering rule in a filter of the network device driver; and
allocating the first reception buffer to the application corresponding to the at least one packet filtering rule.

11. The method of claim 7, wherein the at least one packet filtering rule comprises conditions for at least one of source IP address information, destination IP address information, a source port number, or a destination port number.

12. The method of claim 7, further comprising:
detecting that a low-latency guarantee service for a packet corresponding to the application is needed based on at least one of identification information of the network service or characteristic information for a data transmission path of the network service.

13. The method of claim 12, further comprising determining whether the low-latency guarantee service for the packet corresponding to the application is provided based on at least one of a priority of the application or authority of the application.

14. A non-transitory computer readable medium storing a plurality of instructions wherein execution of the plurality of instructions by one or more processors causes the one or more processors to perform a plurality of operations comprising:

detecting a connection for a network service corresponding to an application included in a user address space;
detecting that a low-latency guarantee service for a packet corresponding to the application is needed;
based on detection of the low-latency guarantee service, acquiring at least one packet filtering rule from the application;
determining whether a packet received through a communication module satisfies at the least one packet filtering rule;
transmitting the packet directly to the user address space allocated to a memory by bypassing a network stack included in a kernel address space allocated to the memory, when the packet satisfies the at least one packet filtering rule; and
transmitting the packet to the user address space through the network stack included in the kernel address space allocated to the memory when the packet does not satisfy the at least one packet filtering rule.

15. The non-transitory computer readable medium of claim 14, wherein the plurality of operations further comprises:
removing a header of the packet transmitted from a network device driver from an application included in the user address space, when the packet satisfies the at least one packet filtering rule.

16. The non-transitory computer readable medium of claim 14, wherein the plurality of operations further comprises:
storing the packet in a first reception buffer allocated to an application included in the user address space corresponding to the at least one packet filtering rule among a plurality of reception buffers included in a network device driver,
wherein the first reception buffer is mapped to a memory address space of the application corresponding to the at least one packet filtering rule, and
wherein the packet stored in the first reception buffer is transmitted to the memory address space of the application mapped to the first reception buffer.

17. The non-transitory computer readable medium of claim 16, wherein the plurality of operations further comprises:
configuring the at least one packet filtering rule in a filter of the network device driver; and
allocating the first reception buffer to the application corresponding to the at least one packet filtering rule.

18. The non-transitory computer readable medium of claim 14, wherein the at least one packet filtering rule comprises conditions for at least one of source IP address information, destination IP address information, a source port number, or a destination port number.

19. The non-transitory computer readable medium of claim 14, wherein the plurality of operations further comprises:
detecting that a low-latency guarantee service for a packet corresponding to the application is needed based on at least one of identification information of the network service or characteristic information for a data transmission path of the network service.

20. The non-transitory computer readable medium of claim 19, wherein the plurality of operations further comprises:
determining whether the low-latency guarantee service for the packet corresponding to the application is provided based on at least one of a priority of the application or authority of the application.

* * * * *